United States Patent [19]

Takeda

[11] Patent Number: 5,440,712
[45] Date of Patent: Aug. 8, 1995

[54] DATABASE INPUT/OUTPUT CONTROL SYSTEM HAVING NONVOLATILE STORING UNIT FOR MAINTAINING THE DATABASE

[75] Inventor: Kuninaga Takeda, Tokyo, Japan
[73] Assignee: NEC Corporation, Tokyo, Japan
[21] Appl. No.: 862,072
[22] Filed: Apr. 2, 1992

[30] Foreign Application Priority Data

Apr. 2, 1991 [JP] Japan .................. 3-096346

[51] Int. Cl.6 .......................................... G06F 12/12
[52] U.S. Cl. .................. 395/444; 364/DIG. 1;
    364/243; 364/243.2; 364/243.5; 364/246;
    364/246.11; 364/254; 364/254.3; 395/485;
    395/486; 395/497.04; 395/600; 395/402
[58] Field of Search ................... 395/425, 600

[56] References Cited

U.S. PATENT DOCUMENTS

| | | | |
|---|---|---|---|
| 4,020,466 | 4/1977 | Cordi et al. | 395/425 |
| 4,077,059 | 2/1978 | Corti et al. | 395/425 |
| 4,084,231 | 4/1978 | Capozzi et al. | 395/425 |
| 4,429,363 | 1/1984 | Duke et al. | 395/425 |
| 4,476,524 | 10/1984 | Brown et al. | 395/325 |
| 4,530,055 | 7/1985 | Hamstra et al. | 395/425 |
| 4,821,172 | 4/1989 | Kaneko et al. | 395/425 |
| 4,916,605 | 4/1990 | Beardsley et al. | 395/425 |
| 4,959,774 | 9/1990 | Davis | 371/12 X |
| 4,974,145 | 11/1990 | Aoyama et al. | 395/425 |
| 5,045,996 | 9/1991 | Barth et al. | 395/425 |
| 5,127,094 | 6/1992 | Bono | 395/400 |
| 5,134,698 | 7/1992 | Imamura et al. | 395/425 |
| 5,307,461 | 4/1994 | Kiriu | 395/250 |

OTHER PUBLICATIONS

NEC Corporation, "ACOS Software ACOS–4/AVP XR VSAS Reference Manual", 1990, (Preface, Contents, Chapter 7—pp. 7–1 to 7–10).
IBM, "IMS/VS Version 1 Data Base Administration Guide", Eleventh Edition, Jun. 1986, pp. vii–xvi and 211.

*Primary Examiner*—Paul V. Kulik
*Attorney, Agent, or Firm*—Foley & Lardner

[57] ABSTRACT

An extended storage unit is utilized to write back information into a slow external storage unit asynchronously with respect to a request from a user's program when the I/O frequency of the external storage unit drops below a certain level. Extended storage information output unit 120 writes blocks 141 contained in extended storage unit 140 into database 101 in the external storage unit 100. A timer 170 actuates extended storage information output unit 120 at preset timer count values. I/O monitoring unit 110 monitors the I/O quantity of a physical I/O unit 130 and actuates the extended storage information output unit 120 based on the I/O quantity. A logical I/O unit 160 shifts information between a buffer 151 in main storage unit 150 and the extended storage unit 140 and makes I/O requests to the physical I/O unit 130.

6 Claims, 5 Drawing Sheets

DATABASE INPUT/OUTPUT CONTROL SYSTEM HAVING NONVOLATILE STORING UNIT FOR MAINTAINING THE DATABASE

BACKGROUND OF THE INVENTION

The instant invention is directed to a database input/output (I/O) control system. More specifically, the invention is directed to a database I/O system which maintains high operational efficiency during multiplex processing of transactions in a large database system.

In a conventional database I/O control system, logical I/O units use physical I/O units to perform I/O control between a buffer in a main storage unit and a database in an external storage unit. Such a system is discussed in a technical manual entitled "ACOS Software ACOS-4/AVP XR VSAS Reference Manual" published by NEC Corporation. When a request for access to information in the database is issued from a user's program, the logical I/O unit searches the buffer in the main storage unit. If, the requested information is not located in the main storage unit, the I/O unit inputs information from the database in the external storage unit and stores the information in the buffer block by block. The updating of information by the user's program is accomplished using the information in the buffer in the main storage unit. Upon completion of a transaction which forms a unit of logical processing by the user's program, the logical I/O unit uses the physical I/O unit to write back the block whose content has been updated (in the buffer) into the external storage unit.

This conventional database I/O control system has the disadvantage that processing of the next transaction by the same user's program cannot be started until the write-back operation is completed because every block updated by processing of a transaction is written back into the external storage unit when the transaction is completed.

IBM systems employ an optional background write function for database management. This function is discussed in a technical manual entitled "IMS/VS Version 1 Data Base Administration Guide" published by IBM. In this IBM technique, an updated block is sent directly to a slow external storage unit. Because the processing speed of an external storage unit is slow, either the processing speed of termination processing is reduced or the updated block must be sent to the external storage unit before termination of transaction processing.

Another disadvantage of conventional systems is that, as improvements in central processing units and main storage units lead to a significant increase in the proportion of time devoted to I/O operations, the frequency of inputting to and outputting from an external storage unit increases with a rise in the degree of multiplexing (execution of a plurality of programs in parallel using the same database), and can become greater than the processing capability of the physical I/O unit. This results in a drop in the transaction processing rate.

SUMMARY OF THE INVENTION

In view of these disadvantages, an object of the instant invention is to provide a database I/O control system which maintains high operational efficiency during multiplex processing of transactions in a large database system by utilizing an extended storage unit composed of a nonvolatile memory to minimize inputting to and outputting from a slow external storage unit and by writing back information to the external storage unit when the I/O frequency of the external storage unit decreases below a certain level.

Another object of the invention is to distribute the load of I/O actions in a large database system.

According to one aspect of the invention, there is provided a database I/O control system for use in a computer system which is provided with a main storage unit, an external storage unit, and an extended storage unit having a nonvolatile memory. The main storage unit is equipped with a buffer which serves as a storage area for inputting data to and outputting data from a database stored in the external storage unit. The database is divided into blocks which are formed in units of input and output. A physical I/O unit performs block inputting and outputting between the external storage unit and the buffer. An extended storage information output unit writes information contained in the extended storage unit into the external storage unit. A timer actuates the extended storage information output unit at predetermined timer count values. An I/O monitoring unit monitors an I/O quantity of the physical I/O unit and actuates the extended storage information output unit based on the I/O quantity. A logical I/O unit shifts information between the buffer and the extended storage unit and makes I/O requests to the physical I/O unit.

According to another aspect of the invention there is provided a process for efficiently managing data in a system which includes a main storage unit, an external storage unit, and an extended storage unit. The process includes the steps of (1) exchanging data between the external storage unit and the main storage unit, (2) exchanging data between the main storage unit and the extended storage unit, and (3) writing data that is contained in the extended storage unit into the external storage unit at predetermined time intervals and when a quantity of physical input/output (I/O) transactions between the main storage unit and the external storage unit drops below a set value. The quantity of physical I/O transactions can be determined on the basis of the average time interval between notification of an end of the writing operation and a physical I/O request. In one embodiment, unfinished writing is suspended when a physical I/O request occurs during the writing operation.

Other objects, advantages, and features of the invention will be apparent from the following detailed description of preferred embodiments.

BRIEF DESCRIPTION OF THE DRAWINGS

The invention will be described in further detail below in conjunction with the accompanying drawings, wherein.

DETAILED DESCRIPTION OF THE PREFERRED EMBODIMENTS

In the database I/O control system 1,000 according to the instant invention, an extended storage information output unit 120 writes out information contained in an extended storage unit 140 into an external storage unit. A timer 170 actuates the extended storage information output unit at predetermined timer count values. An I/O monitoring unit 110 monitors an I/O quantity of a physical I/O unit 130 and actuates the extended storage information output unit 120 based on the I/O quantity. A logical I/O unit 100 shifts information between a buffer 151 and the extended storage unit 140, and makes I/O requests to the physical I/O unit.

Figure 1:
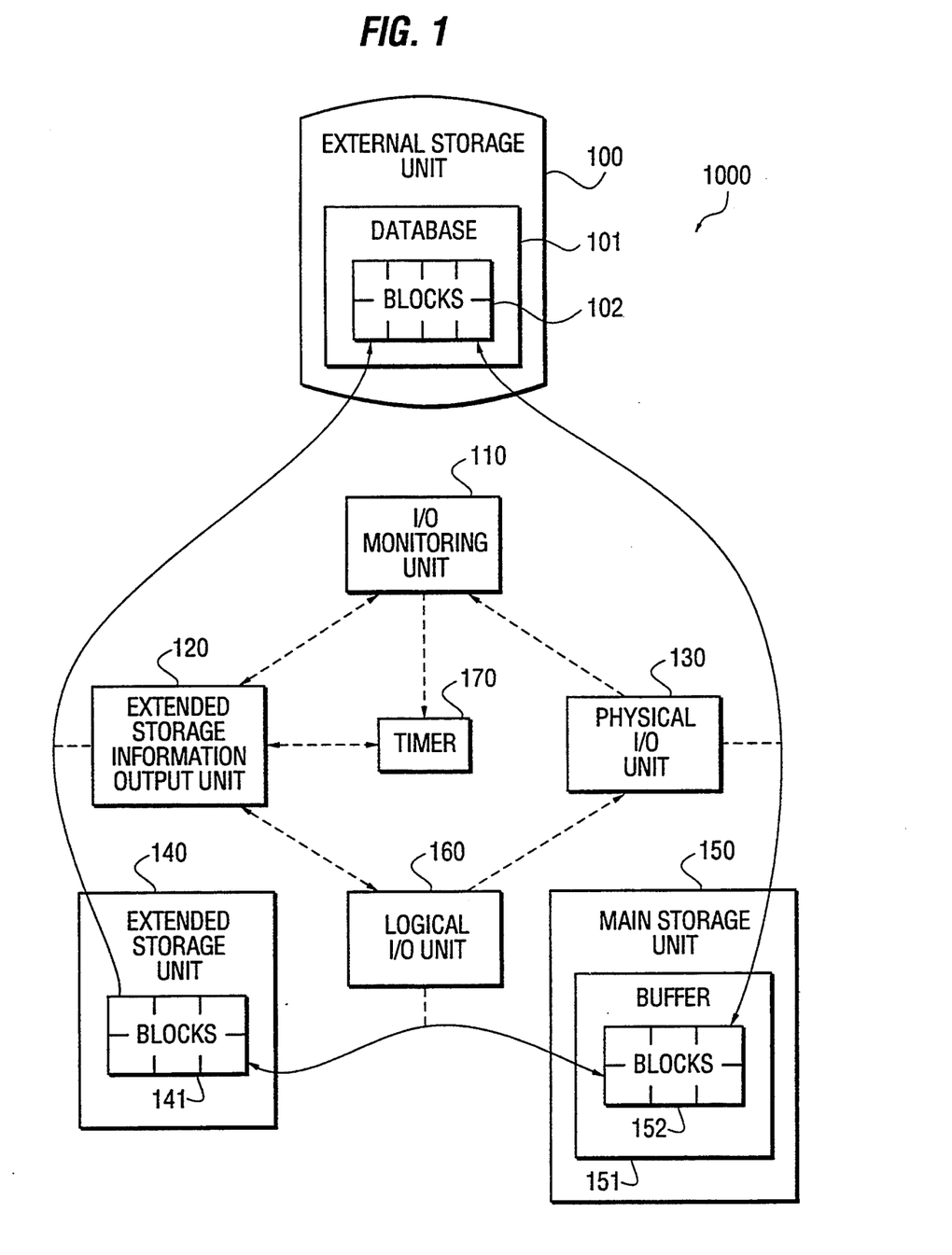
FIG. 1 is a block diagram illustrating a database I/O control system according to a preferred embodiment of the invention.

FIG. 1 is a block diagram illustrating a database I/O control system 1000 according to a preferred embodiment of the invention. Database I/O control system 1,000 includes an external storage unit 100 to store a database 101, which is divided into blocks 102. Blocks 102 form I/O units. System 1000 also includes an I/O monitoring unit 110, an extended storage information output unit 120, a physical I/O unit 130, an extended storage unit 140 to hold blocks 141, a main storage unit 150 to store a buffer 151 which is divided into blocks 152, a logical I/O unit 160, and a timer 170.

The external storage unit 100 includes a magnetic disk unit or other low-cost-per-unit storage device. Extended storage unit 140 includes a nonvolatile memory. In the extended storage unit 140, blocks 152 of buffer 151 are stored as blocks 141 by the logical I/O unit 160. Main storage unit 150 is a shared resource for the entire computer system. In main storage unit 150, the region usable by the database I/O control system 1000 is confined to buffer 151. In buffer 151, blocks entered from the external storage unit 100 by the physical I/O unit 130 are stored as blocks 152. Timer 170 actuates the extended storage information output unit 120 at predetermined timer count values when input or output processing does not generate sufficient activity.

The I/O monitoring unit 110 and the extended storage information output unit 120 are implemented in software as a portion of the database management system and will be described in further detail below. The physical I/O unit 130 is implemented by an I/O controller and a disk controller and associated software.

The extended storage unit 140 is coupled to a CPU (central processing unit) via a bus and transfers information at much higher speeds than the external storage unit 100. The storage medium of the extended storage unit 140 is a semiconductor memory. The main storage unit 150 is implemented by dynamic metal oxide semiconductor memory devices. An error correcting code is employed during data transfer between main storage unit 150 and the CPU. Unlike the extended storage unit 140 and external storage unit 100, the expansion capability of main storage unit 150 depends on the address space defined by the software being used.

The logical I/O unit 160 is implemented by software which controls data transfer between main storage unit 150 and extended storage unit 140. This software also controls blocks 141 and the activation of physical I/O unit 130 when a desired block is not stored in extended storage unit 140.

Timer 170 is implemented by software which activates and stops the operation of each unit using clock signals generated by a clock generator. The timer 170 can stop operation of a unit for a period of time and can activate the unit after the elapse of the period of time.

Figure 2:
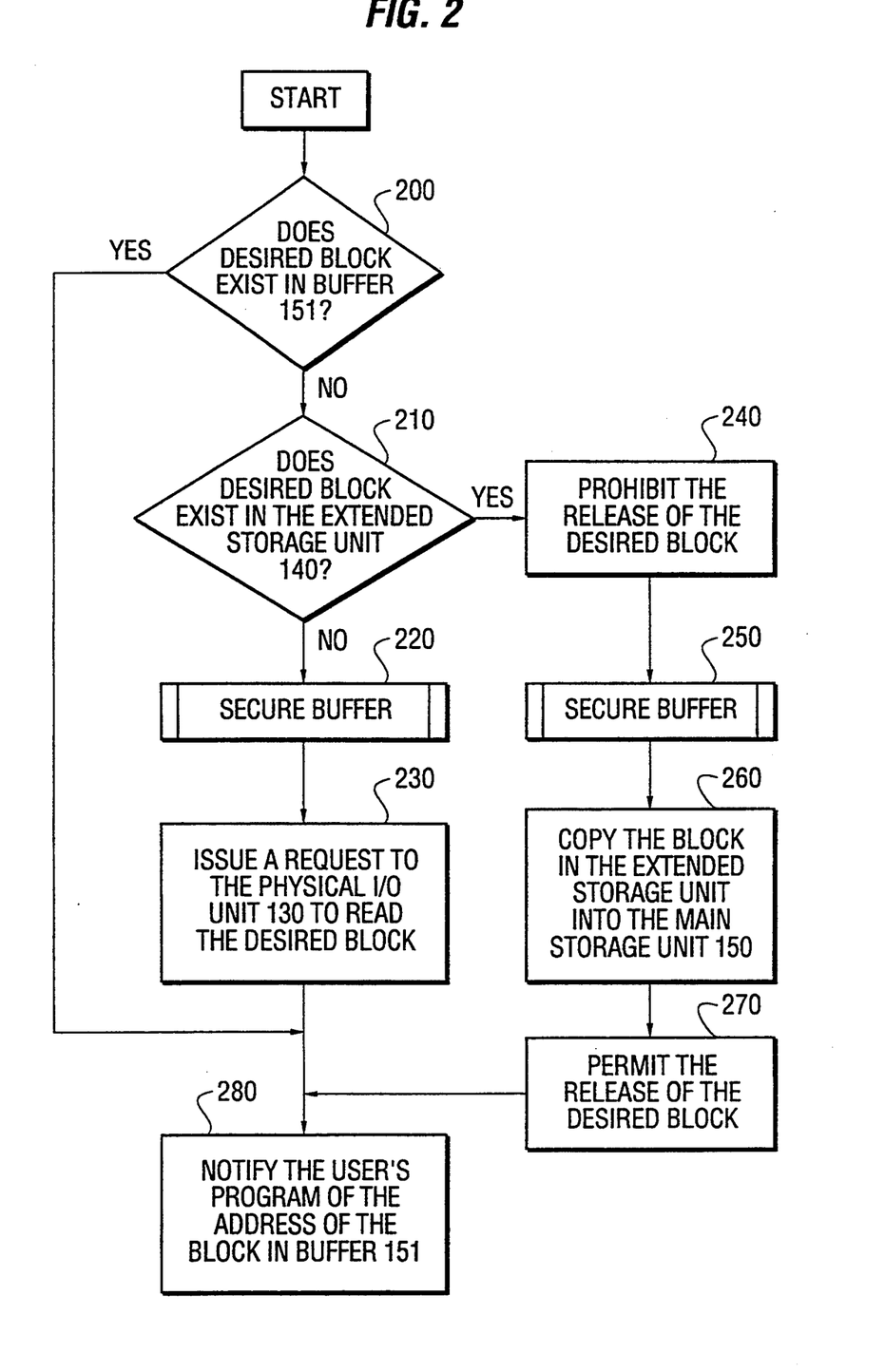
FIG. 2 is a flowchart illustrating processing performed by the logical I/O unit of FIG. 1.

In FIG. 2, the processing performed by the logical I/O unit 160 is illustrated. This processing includes a buffer searching step 200, an extended storage unit searching step 210, buffer securing process step 220, a block read requesting step 230, a block release prohibiting step 240, another buffer securing process step 250, a block copying step 260, a block release permitting step 270, and an address notifying step 280. The processing performed by logical I/O unit 160 will be described in further detail below in conjunction with a description of overall system operation.

Figure 3:
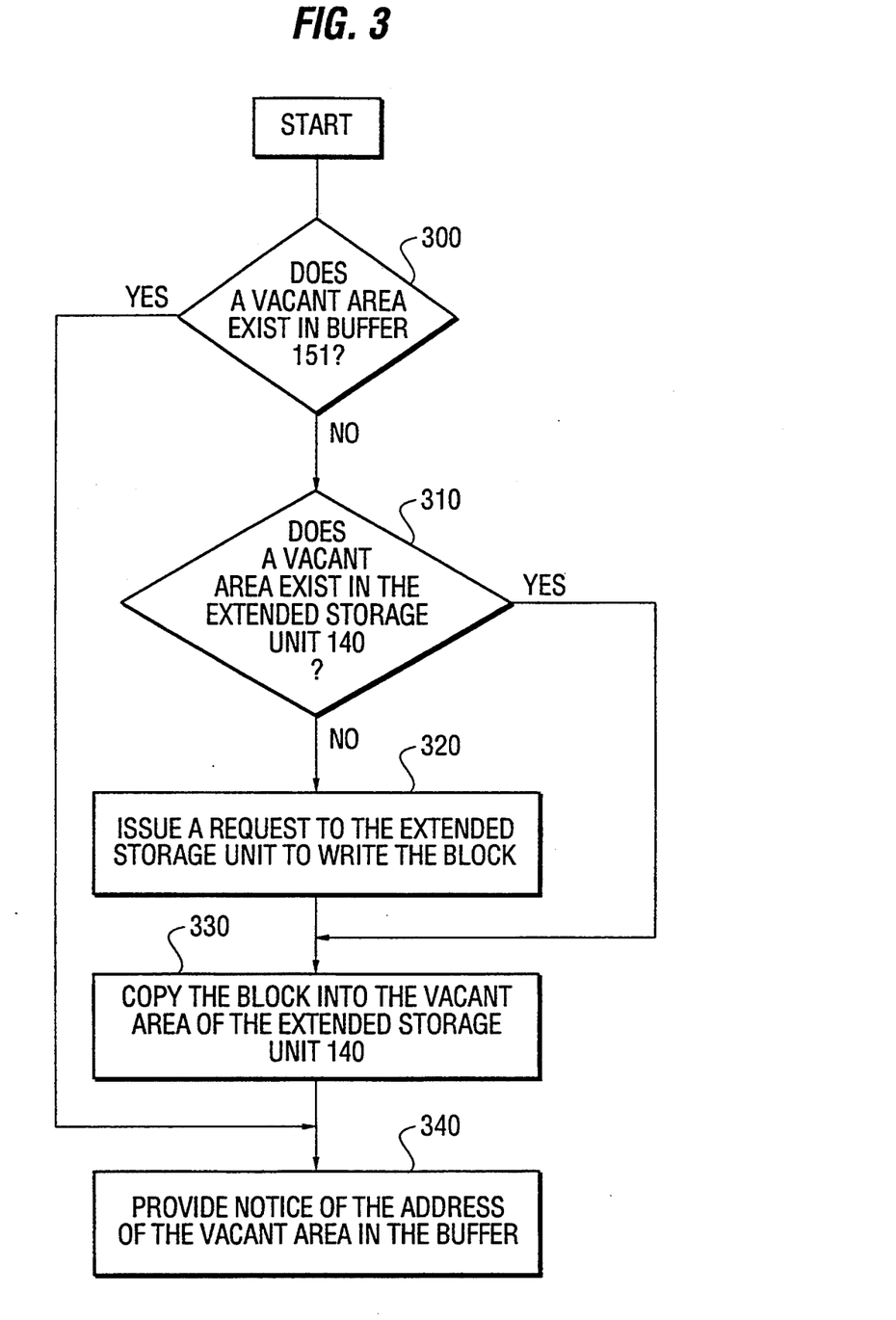
FIG. 3 is a flowchart illustrating the buffer securing processes in further detail.

FIG. 3 illustrates the buffer securing process steps 220 and 250 in further detail. Each of the buffer securing processes 220 and 250 includes a vacant buffer area searching step 300, a vacant extended storage area searching step 310, a block write requesting step 320, a block copying step 330, and an address notifying step 340. This processing will be described in further detail below in conjunction with the description of overall system operation.

Figure 4:
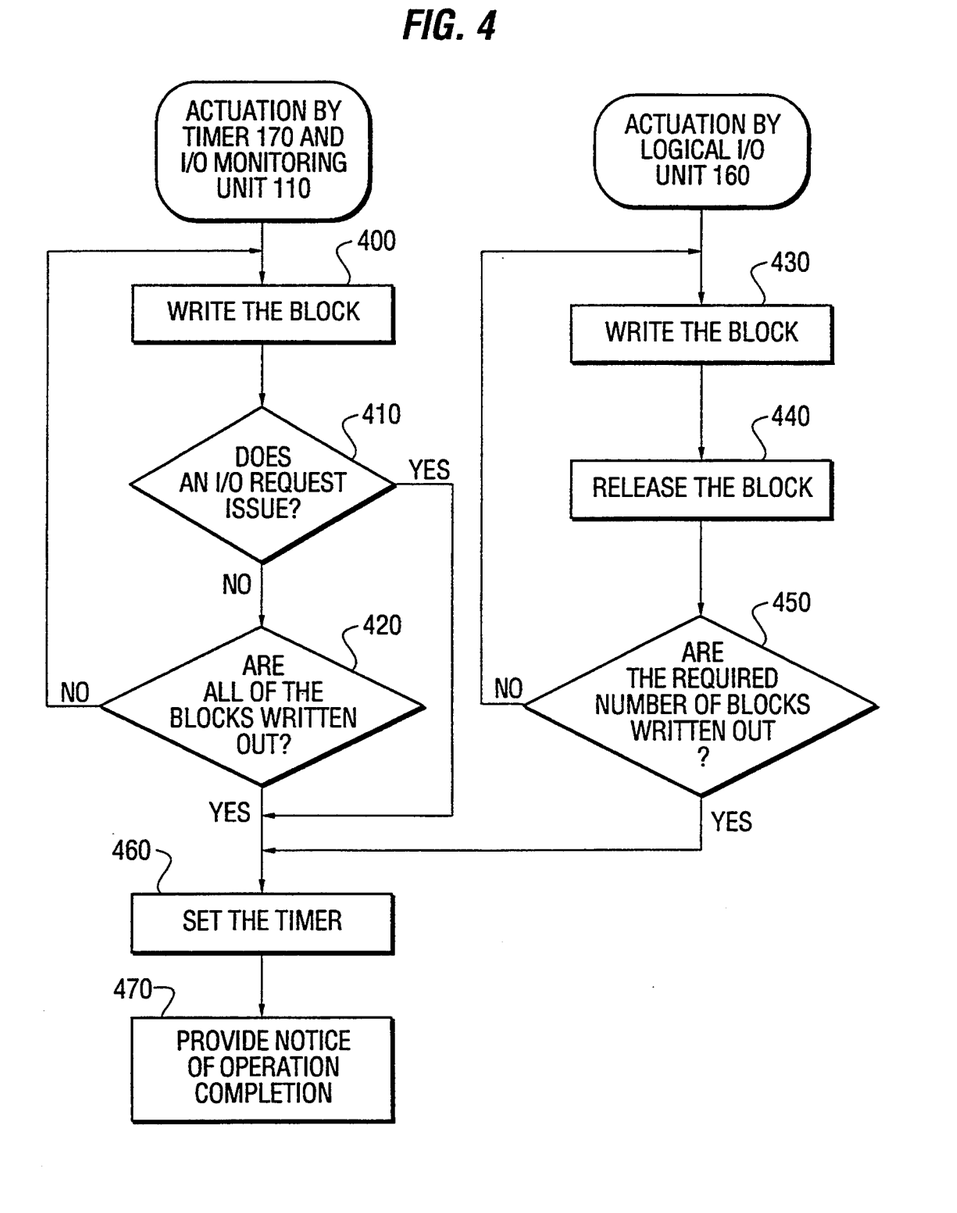
FIG. 4 is a flowchart illustrating the processing performed by the extended storage information output unit of FIG. 1.

FIG. 4 illustrates the processing performed by the extended storage information output unit 120. The processing performed by the extended storage information output unit 120 includes a block writing step 400, an I/O request detecting step 410, a block write end detecting step 420, block writing step 430, a block releasing step 440, another block write end detecting step 450, a timer setting step 460, and an operation end notifying step 470. This processing will be described in further detail below in conjunction with the description of overall system operation.

Figure 5:
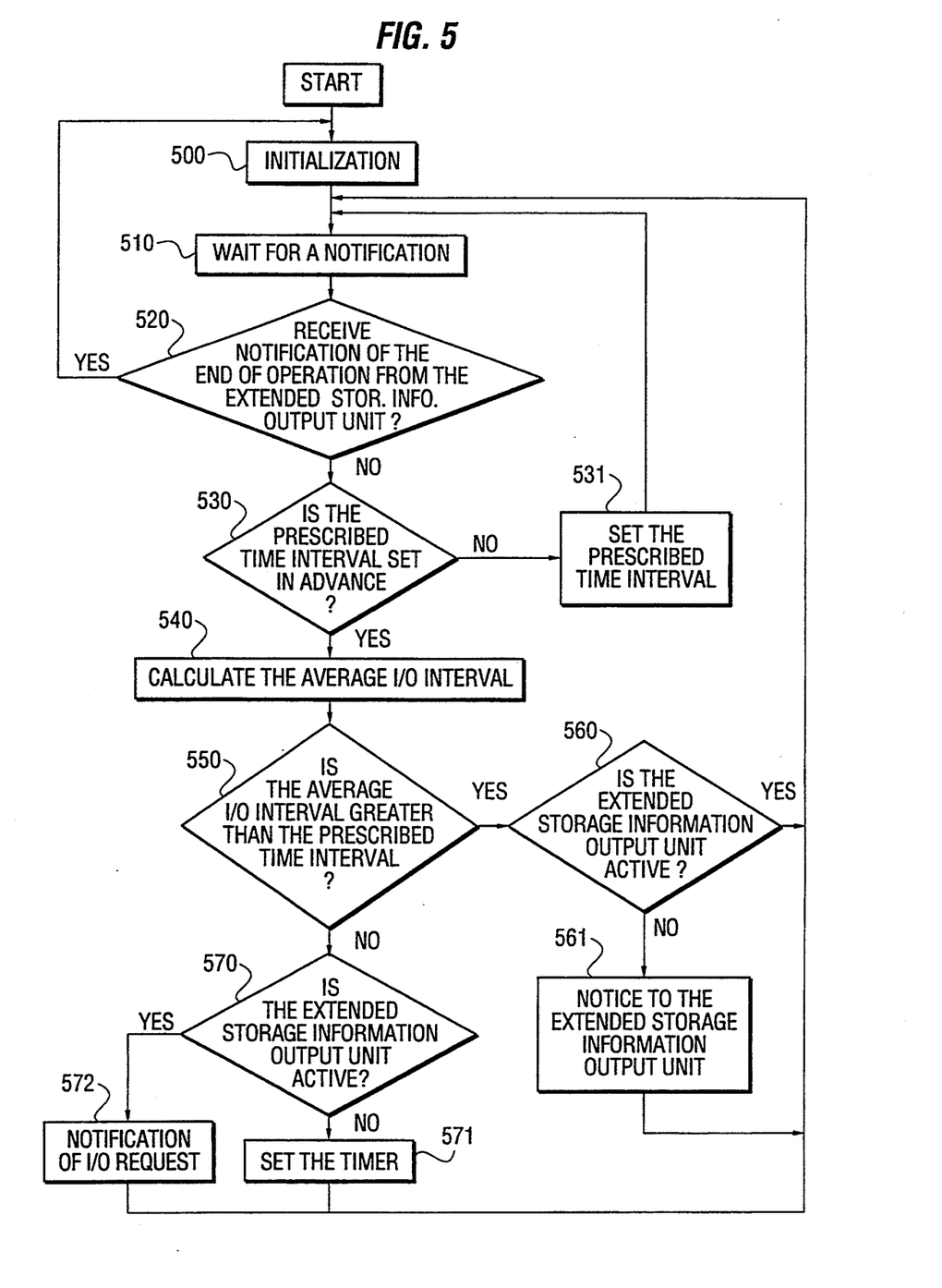
FIG. 5 is a flowchart illustrating the processing performed by the I/O monitoring unit of FIG. 1.

FIG. 5 illustrates the processing performed by the I/O monitoring unit 110. The processing performed by the I/O monitoring unit 110 includes an initializing step 500, a notification waiting step 510, an operation end notification detecting step 520, a prescribed time interval setting detecting step 530, a prescribed time interval setting step 531, an average I/O interval calculating step 540, an average I/O interval detecting step 550, an active extended storage information output unit detecting step 560, an extended storage information output unit actuation notifying step 561, another active extended storage information output unit detecting step 570, a timer setting step 571, and an I/O request notifying step 572.

Overall operation of the database I/O control system 1000 will now be described in detail.

First, the logical I/O unit 160 operates when a request for access to information in database 101 is issued from a user's program (not shown in the figures). When a request comes from the user's program for access to information in database 101, the logical I/O unit 160 first searches buffer 151 for a desired block 152 containing the information requested by the user's program (step 200). This sequence saves access cost. If the desired block is found in buffer 151, then the logical I/O unit 160 notifies the user's program of the address of the retrieved block 152 (step 280). If the desired block is not found in buffer 151, then the logical I/O unit 160 searches the extended storage unit 140 for the desired block (step 210). If the desired block is also not found in the extended storage unit 140, then the logical I/O unit 160 secures a vacant area in which to place the desired block 102 in buffer 151 (process 220).

Then, the logical I/O unit 160 issues a request to the physical I/O unit 130 to read the desired block 102 (step 230) and, upon storage of the desired block 102 into the vacant area secured in buffer 151 by the physical I/O unit 130, notifies the user's program of the address of the desired block 152 in buffer 151 (step 280).

On the other hand, if the desired block 141 is found in the extended storage unit 140 at step 210, then the logical I/O unit 160 prohibits the release of the retrieved block 141 to prevent its deletion from the extended storage unit 140 at the next buffer securing process 250 (step 240).

Next, the logical I/O unit 160 secures a vacant space, in which to place the desired block 141, in buffer 151 (process 250), copies the desired block 141 from the extended storage unit 140 into the vacant area in the main storage unit 150 (step 260), permits the release of the desired block 141 in the extended storage unit 140 (step 270), and notifies the user's program of the address of the desired block 152 in buffer 151 (step 280).

The buffer securing processes 220 and 250 of FIG. 2 will now be described in detail with reference to FIG. 3.

In the buffer securing processes 220 and 250, first the buffer 151 in the main storage unit 150 is searched for a vacant area (step 300). If a vacant area is found in the buffer 151, then notice of the address of the vacant area is provided to the requester to complete the process (step 340). In the absence of a vacant area in buffer 151, block 152 in buffer 151 is set aside in the extended storage unit 140, and processing to secure a vacant area is performed. More specifically, the extended storage unit 140 is searched for a vacant area (step 310) and, if any vacant area is found in the extended storage unit 140, block 152 in buffer 151 is copied into the vacant area in extended storage unit 140 (step 330). Because a vacant area in which to place the new block 152 is now available, notice of the address of the detected vacant area is provided to the requester to complete the process (step 340).

If a vacant area is not found at step 310, then the processing proceeds on to step 320. Operation of the extended storage information output unit 120, when it is actuated by the logical I/O unit 160 at step 320, will now be described in detail.

The extended storage information output unit 120, upon actuation by a write request from the logical I/O unit 160 at step 320, writes, out of the blocks 141 in the extended storage unit 140, what is already updated and not prohibited from release (at step 240) into the external storage unit 100 (step 430). Then, the extended storage information output unit 120 releases blocks 141, which were copied into the external storage unit 100 (step 440). Next, the extended storage information output unit 120, because the logical I/O unit 160 has issued a write request designating the number of blocks required to fill the vacant areas at step 320, checks whether or not the requested number of blocks have been written out (step 450) and, if the required number of blocks have not been written out, returns processing back to step 430 to write out the next block or blocks 141. When the requested number of blocks have been fully written out, the extended storage information output unit 120 sets the timer 170 to a prescribed timer count value (step 460) and provides notice to the logical I/O unit 160 of the completion of the operation (step 470). After providing notification of the end of operation, the extended storage information output unit 120 stands by for future operation.

Upon notification by the logical I/O unit 160 at step 280 of the address of the desired block 152, the user's program refers to the desired block 152 in buffer 151 for information and/or updates the block. At the end of the transaction, the logical I/O unit 160 copies updated blocks out of the blocks 152 and into the extended storage unit 140. Operation of the logical I/O unit 160 upon completion of the transaction consists of repetition of the same processing that is shown for steps 310 through 330.

The extended storage information output unit 120, in addition to being actuated by the logical I/O unit 160, is also actuated by timer 170 and I/O monitoring unit 110 asynchronously with the processing of a transaction.

Operation of the extended storage information output unit 120 when it is actuated by the timer 170 will now be described.

When the prescribed timer count value, set either by the extended storage information output unit 120 at step 460 or by the I/O monitoring unit 110 at step 571, has passed, the timer 170 actuates the extended storage information output unit 120. Upon actuation by the timer 170, the extended storage information output unit 120 writes the updated blocks 141 in the extended storage unit 140, whose release was not prohibited at step 240, into the external storage unit 100 (step 400). Then, the extended storage information output unit 120 checks whether or not the I/O monitoring unit 110 gave at step 572 notification that the physical I/O unit 130 had issued an I/O request (step 410).

If the result of checking for an I/O request notification from the I/O monitoring unit 110 reveals the presence of an I/O request from the physical I/O output unit 130, the extended storage information output unit 120, after setting the timer 170 to a prescribed timer count value (step 460), notifies the I/O monitoring unit 110 of the end of the operation (step 470) and suspends uncompleted operation. Because the physical I/O unit 130 operates on an I/O request from the user's program, priority is given to an operation by the physical I/O unit 130 over one by the extended storage information output unit 120 to maintain high operational efficiency. When actuated by the logical I/O unit 16Q, the extended storage information output unit 120 operates in synchronism with an I/O request from a user's program, and, therefore, there is no need to give priority to the operation of the physical I/O unit 130.

In the absence of an I/O request from the physical I/O unit 130, the extended storage information output unit 120 checks whether or not all of the updated blocks 141 in the extended storage unit 140, which are not prohibited from release, have been written into the external storage unit 100 (step 420). If there is any updated block 141, whose release is not prohibited, remaining in the extended storage unit 140, then the extended storage information output unit 120 returns processing back to step 400, and writes the next updated block, whose release is not prohibited, into the external storage unit 100. When all of the updated blocks 141 have been written into the external storage unit 100, the extended storage information output unit 120, after setting the timer 170 to a prescribed timer count value (step 460), notifies the I/O monitoring unit 110 of the end of the operation (step 470).

The I/O monitoring unit 110, while monitoring the operation of the physical I/O unit 130, actuates the extended storage information output unit 120 in accordance with the I/O quantity of the physical I/O unit 130. Thus, when the average of the I/O action intervals (the average I/O interval) of the physical I/O unit 130 exceeds a predetermined time interval, the I/O monitoring unit 110 judges that there is little risk of adversely affecting the operational efficiency of the database system, and actuates the extended storage information output unit 120.

Operation of the I/O monitoring unit 110 will now be described in further detail.

The I/O monitoring unit 110 is actuated upon initialization of the associated computer system and, after its own initialization (step 500), waits for a notification from either the extended storage information output unit 120 or the physical I/O unit 130 (step 510). If a notification is received during the operation of the database system, the I/O monitoring unit 110 determines whether the notification is a notification of the end of operation from the extended storage information output unit 120 or a notification of an I/O request from the physical I/O unit 130 (step 520). If the notification is a notification of the end of operation from the extended storage information output unit 120, then the I/O monitoring unit 110 returns processing back to step 500, re-initializes itself (step 500), and again waits for notification (step 510). If the notification is not a notification of the end of operation from the extended storage information output unit 120, because the notification is a notification of an I/O request from the physical I/O unit 130, the I/O monitoring unit 110 checks whether or not a prescribed time interval for calculating the average I/O interval has been set in advance (step 530). If a prescribed time interval has not been set in advance, the I/O monitoring unit 110 sets the prescribed time interval (step 531), returns processing back to step 510, and waits for the next notification.

If a prescribed time interval for calculating the average I/O interval has been preset, then the I/O monitoring unit 110 calculates the average I/O interval (step 540). The I/O monitoring unit 110 calculates average I/O intervals as, for example, the average of the time interval from notification of the end of operation by the extended storage information output unit 120 until an I/O request by the physical I/O unit 130. Then the I/O monitoring unit 110 compares the calculated average I/O interval with the prescribed time interval (step 550) and, if the former is longer than the latter, checks whether or not the extended storage information output unit 120 is already operating (step 560). If the extended storage information output unit 120 is operating, then the I/O monitoring unit 110 returns processing back to step 510 and waits for a notification. If the extended storage information output unit 120 is not operating, then the I/O monitoring unit 110, after notifying the extended storage information output unit 120 of its actuation (step 561), returns processing back to step 510 and waits for a notification.

If the average I/O interval is not longer than the prescribed time interval, then the I/O monitoring unit 110 checks whether or not the extended storage information output unit 120 is operating (step 570). If the extended storage information output unit 120 is not operating, then the I/O monitoring unit 110 sets the timer 170 to a prescribed timer count value to actuate the extended storage information output unit 120 (step 571), returns processing back to step 510, and waits for a notification. If the extended storage information output unit 120 is operating, then the I/O monitoring unit 110 notifies the extended storage information output unit 120 of an I/O request from the physical I/O unit 130 (step 572), returns processing back to step 510, and waits for a notification.

As described above, the instant invention makes it possible to distribute the load of I/O actions by providing an extended storage information output unit to write information located in an extended storage unit into an external storage unit, a timer for actuating the extended storage information output unit at preset timer count values, an I/O monitoring unit to monitor the I/O quantity of a physical I/O unit and to actuate the extended storage information output unit based on the I/O quantity, and a logical I/O unit to shift information between a buffer and the extended storage unit and to make I/O requests to the physical I/O unit. Updated blocks are written into the external storage unit when the I/O frequency of the physical I/O unit drops, resulting in the benefit of making it possible to maintain a high operational frequency for multiplex processing of transactions in database systems.

The invention also provides the additional benefit of improving the time efficiency on a transaction-by-transaction basis because writing into a slow external storage unit is not performed at the time of completion of a transaction, which is the unit of logical processing of the user's program.

Although the invention has been described above with respect to certain specific embodiments, the scope of the invention is not limited to these specific embodiments. Other designs within the spirit and scope of the invention will be apparent to those skilled in the field after receiving the above teachings. The invention, therefore, is defined with reference to the following claims.

What is claimed is:

1. A process for efficiently managing data in a system including a main storage unit, an external storage unit, and an extended storage unit, said process comprising the steps of:
   exchanging data between said external storage unit and said main storage unit;
   exchanging data between said main storage unit and said extended storage unit; and
   writing data in said extended storage unit into said external storage unit at predetermined time intervals and when a quantity of physical input/output (I/O) transactions, between said main storage unit and said external storage unit, drops below a set value.

2. A process as set forth in claim 1, further comprising the step of:
   determining said quantity of physical I/O transactions on the basis of an average time interval between notification of an end of said writing data and a physical I/O request.

3. A process as set forth in claim 1, comprising the further step of:
   suspending uncompleted writing when a physical I/O request occurs during said writing.

4. A database input/output (I/O) control system in a computer system, said database I/O control system comprising:
   an external storage unit, said external storage unit containing a database which is divided into blocks which form input and output units;
   a main storage unit having a buffer which serves as a storage area for inputting information to and outputting information from said database;

an extended storage unit having a nonvolatile memory;

a physical I/O unit for inputting and outputting said blocks between said external storage unit and said buffer;

an extended storage information output unit to write information contained in said extended storage unit into said external storage unit;

a timer to actuate said extended storage information output unit at predetermined timer count values;

an I/O monitoring unit to monitor an I/O quantity of said physical I/O unit and to actuate said extended storage information output unit in accordance with said I/O quantity; and a logical I/O unit to shift information between said buffer and said extended storage unit and to make I/O requests to said physical I/O unit.

5. A database I/0 control system as set forth in claim 4, wherein:

said I/O monitoring unit determines said I/O quantity of said physical I/O unit on the basis of an average time interval between notification of an end of an operation by said extended storage information output unit and an I/O request by said physical I/O unit.

6. A database I/O control system as set forth in claim 4, wherein:

said extended storage information output unit operates in accordance with notification signals from said timer, said logical I/O unit, and said I/O monitoring unit;

said extended storage information output unit stands by for operation after providing notification of an end an operation; and said extended storage information output unit suspends uncompleted operation upon notification from said I/O monitoring unit.

* * * * *